US009513935B2

(12) United States Patent
Cardonha et al.

(10) Patent No.: US 9,513,935 B2
(45) Date of Patent: Dec. 6, 2016

(54) AUTO-SCALING THRESHOLDS IN ELASTIC COMPUTING ENVIRONMENTS

(71) Applicant: International Business Machines Corporation, Armonk, NY (US)

(72) Inventors: Carlos H. Cardonha, Sao Paulo (BR); Marcos D. de Assuncao, Lyons (FR); Renato L. de Freitas Cunha, Sao Paulo (BR); Marco A. Stelmar Netto, Sao Paulo (BR)

(73) Assignee: International Business Machines Corporation, Armonk, NY (US)

( * ) Notice: Subject to any disclaimer, the term of this patent is extended or adjusted under 35 U.S.C. 154(b) by 101 days.

(21) Appl. No.: 14/525,376

(22) Filed: Oct. 28, 2014

(65) Prior Publication Data

US 2016/0117180 A1    Apr. 28, 2016

(51) Int. Cl.
*G06F 9/44* (2006.01)
*G06F 11/34* (2006.01)
*G06F 9/445* (2006.01)
*G06F 11/30* (2006.01)
*G06F 9/50* (2006.01)

(52) U.S. Cl.
CPC ......... *G06F 9/44505* (2013.01); *G06F 9/5011* (2013.01); *G06F 11/3024* (2013.01); *G06F 11/3409* (2013.01)

(58) Field of Classification Search
CPC ........................... G06F 9/4411; G06F 9/4401
See application file for complete search history.

(56) References Cited

U.S. PATENT DOCUMENTS

| | | | |
|---|---|---|---|
| 5,633,987 A | 5/1997 | Teng et al. | |
| 8,013,760 B2 | 9/2011 | Turnock et al. | |
| 8,365,088 B1 * | 1/2013 | Rodriguez | G06F 17/5045 345/691 |
| 9,122,562 B1 * | 9/2015 | Stickle | G06F 8/71 |
| 2006/0180377 A1 | 8/2006 | Hofbeck et al. | |
| 2006/0253295 A1 * | 11/2006 | Sekigawa | G06Q 30/04 705/34 |
| 2008/0175438 A1 | 7/2008 | Alves | |
| 2010/0050180 A1 * | 2/2010 | Amsterdam | G06F 9/5027 718/104 |
| 2012/0084443 A1 | 4/2012 | Theimer et al. | |
| 2012/0185913 A1 * | 7/2012 | Martinez | G06F 9/455 726/1 |
| 2012/0254443 A1 * | 10/2012 | Ueda | H04L 67/1008 709/226 |
| 2012/0308975 A1 * | 12/2012 | Hsiao | G06F 19/3481 434/247 |
| 2013/0086273 A1 * | 4/2013 | Wray | G06F 9/5072 709/226 |
| 2013/0179895 A1 | 7/2013 | Calder et al. | |
| 2013/0185431 A1 * | 7/2013 | Venkatesh | G06F 9/5072 709/226 |
| 2013/0262671 A1 | 10/2013 | Baumback et al. | |
| 2014/0047437 A1 | 2/2014 | Wu et al. | |
| 2014/0297866 A1 * | 10/2014 | Ennaji | G06F 9/45533 709/226 |
| 2015/0281113 A1 * | 10/2015 | Siciliano | G06F 9/5072 709/226 |

FOREIGN PATENT DOCUMENTS

| | | |
|---|---|---|
| EP | 2275996 A2 | 1/2011 |
| EP | 2503514 A2 | 9/2012 |
| WO | 2009149099 A1 | 12/2009 |
| WO | 2013004864 A1 | 1/2013 |

OTHER PUBLICATIONS

Mao et al., "Cloud Auto-scaling with Deadline and Budget Constraints", 11th IEEE/ACM International Conference on Grid Computing, pp. 41-48, © 2010 IEEE.
Yuan et al., "Scryer: Netflix's Predictive Auto Scaling Engine—Part 2", The Netflix Tech Blog, Dec. 4, 2013, <http://techblog.netflix.com/2013/12/scryer-netflixs-predictive-auto-scaling.html>.
"Monitoring Your Instances with CloudWatch", Amazon Elastic Compute Cloud—User Guide for Linux (API Version Jun. 15, 2014), awsdocumentation, provided by inventors in disclosure, retrieved on Sep. 11, 2014, <http://docs.aws.amazon.com/AWSEC2/latest/UserGuide/using-cloudwatch.html>.
"How to Scale a Cloud Service", Azure, provided by inventors in disclosure, retrieved on Sep. 11, 2014, <http://azure.microsoft.com/en-us/documentation/articles/cloud-services-how-to-scale/>.

* cited by examiner

*Primary Examiner* — Phil Nguyen
(74) *Attorney, Agent, or Firm* — Noah A. Sharkan (57) ABSTRACT

Embodiments of the present invention provide systems, methods, and computer program products for configuring auto-scaling parameters of a computing environment, as well as alerting a user when auto-scaling operations are not attainable given current operating configurations.

17 Claims, 7 Drawing Sheets

AUTO-SCALING THRESHOLDS IN ELASTIC COMPUTING ENVIRONMENTS

FIELD OF THE INVENTION

The present invention relates generally to the field of elastic computing environments, and more particularly to auto-scaling thresholds in elastic computing environments.

BACKGROUND OF THE INVENTION

Elastic computing environments, also known as cloud computing environments, can be expanded or shrunk to meet the needs of users and computing tasks. Expanding and shrinking elastic computing environments typically entail allocating and releasing resources (e.g., network bandwidth, memory, CPU cores or frequency, computing systems, etc.), which can be performed automatically in accordance with auto-scaling thresholds. Auto-scaling thresholds typically include an upper bound and a lower bound for a performance metric that trigger allocation or release, respectively, of a specified number of resources.

SUMMARY

According to one embodiment of the present invention, a method for configuring auto-scaling parameters of a computing environment is provided comprising: receiving, by one or more computer processors, specified values for one or more auto-scaling parameters of a plurality of auto-scaling parameters to be used in a computing environment; and calculating, by one or more computer processors, a configuration for the plurality of auto-scaling parameters as a function of the specified values, wherein the configuration reduces an amount of auto-scaling operations needed to raise or lower an amount of resources allocated for the computing environment to a desired level.

DETAILED DESCRIPTION

Embodiments of the present invention recognize that improperly defined auto-scaling parameters can result in unnecessary and/or ineffective auto-scaling operations, both of which can increase operational costs and degrade performance of an elastic computing environment. Embodiments of the present invention provide systems, methods, and computer products for defining optimal auto-scaling parameters, as well as alerting a user when auto-scaling operations are not attainable given current operating configurations.

Figure 1:
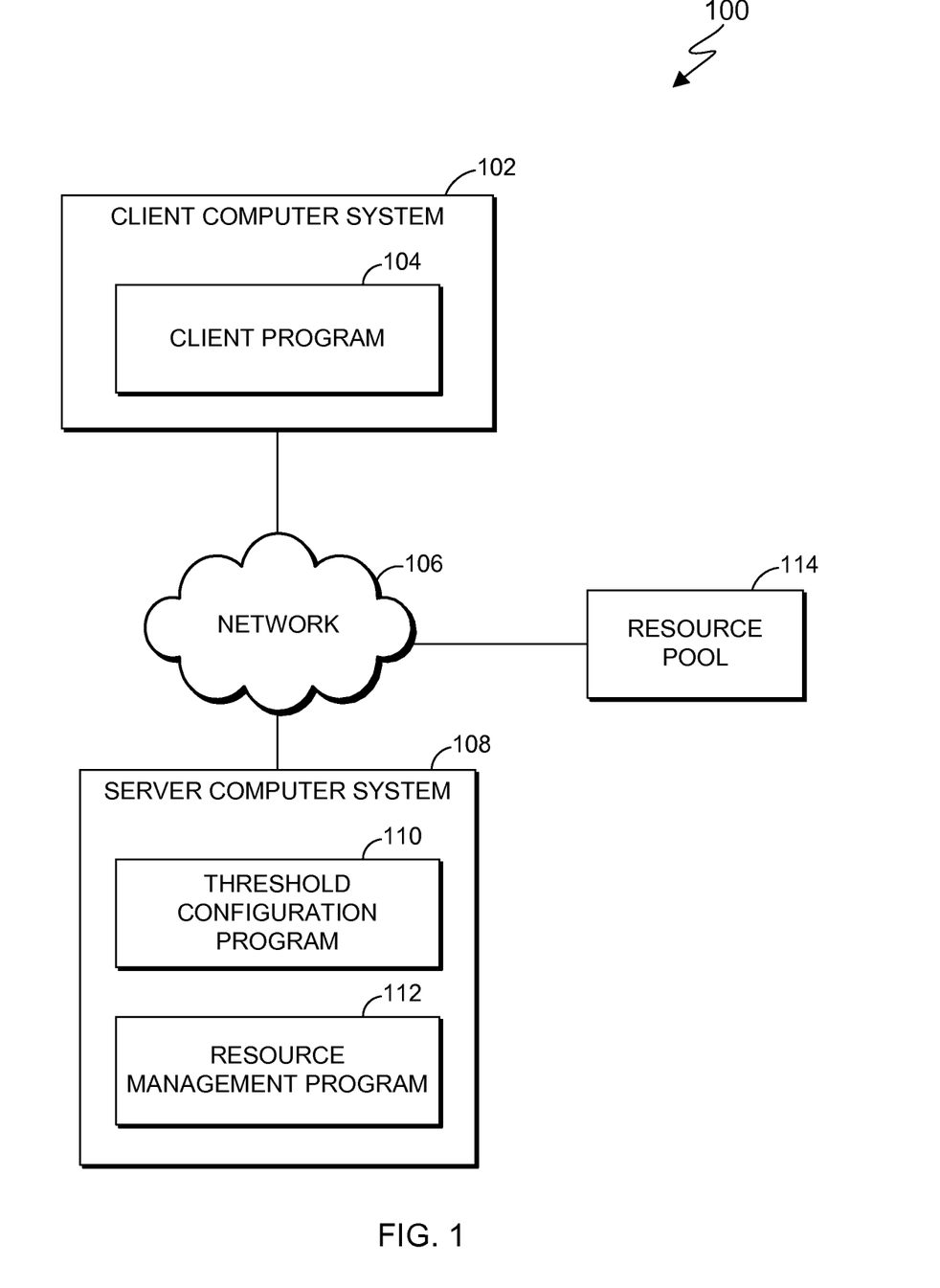
FIG. 1 is a block diagram of a computing environment, in accordance with an embodiment of the present invention.

FIG. 1 is a functional block diagram of a computing environment 100, in accordance with an embodiment of the present invention. Computing environment 100 includes client computer system 102 and server computer system 108, interconnected by network 106. Client computer system 102 and server computer system 108 can be desktop computers, laptop computers, specialized computer servers, or any other computer systems known in the art. In certain embodiments, client computer system 102 and server computer system 108 represent computer systems utilizing clustered computers and components to act as a pool of seamless resources when accessed through network 106. For example, such embodiments may be used in data center, cloud computing, storage area network (SAN), and network attached storage (NAS) applications. In certain embodiments, client computer system 102 and server computer system 108 represent virtual machines. In general, client computer system 102 and server computer system 108 are representative of any electronic devices, or combination of electronic devices, capable of executing machine-readable program instructions, as described in greater detail with regard to FIG. 5.

Client computer system 102 includes client program 104. Client program 104 receives user input regarding auto-scaling parameters and transmits data to threshold configuration program 110 via network 106. Client program 104 can be implemented, for example, as one or more software programs executing locally on client computer system 102 and/or as one or more web applications accessed through browser software.

Server computer system 108 includes threshold configuration program 110 and resource management program 112. Threshold configuration program 110 receives initially defined auto-scaling parameters from client program 104 via network 106, and calculates optimal values for one or more other auto-scaling parameters. In this manner, threshold configuration program 110 can assist a user of client computer system 102 in defining optimal auto-scaling parameters, including high and low thresholds. Threshold configuration program 110 further stores auto-scaling parameters for access by resource management program 112.

Resource management program 112 allocates and releases resources of resource pool 114 for use in performing a requested computing task, such as executing one or more user applications (not shown). Resource management program 112 monitors one or more performance metrics of allocated resources and/or the computing task (e.g., utilization level, throughput, average response time, etc.), as well as compliance with thresholds configured and stored by threshold configuration program 110. Where such performance metrics exceed or fall below specified thresholds, resource management program 112 can auto-scale the resources allocated to the computing task by allocating or releasing resources of resource pool 114, as appropriate. In some instances, resource management program 112 can provide alerts when configured or desired auto-scaling parameters are not feasible, and can assist a user in establishing feasible configurations.

Resource pool 114 represents an elastic pool of resources (e.g., virtual machines, hardware computing systems, and other combinations of software and hardware) that can be allocated, monitored, and released by resource management program 112 to facilitate performance of requested computer tasks.

Network 106 can be, for example, a local area network (LAN), a wide area network (WAN) such as the Internet, or a combination of the two, and include wired, wireless, or fiber optic connections. In general, network 106 can be any combination of connections and protocols that will support communications between client computer system 102, server computer system 108, and resource pool 114, in accordance with a desired embodiment of the present invention.

It should be understood that, for illustrative purposes, FIG. 1 does not show other computer systems and elements which may be present when implementing embodiments of the present invention.

Figure 2:
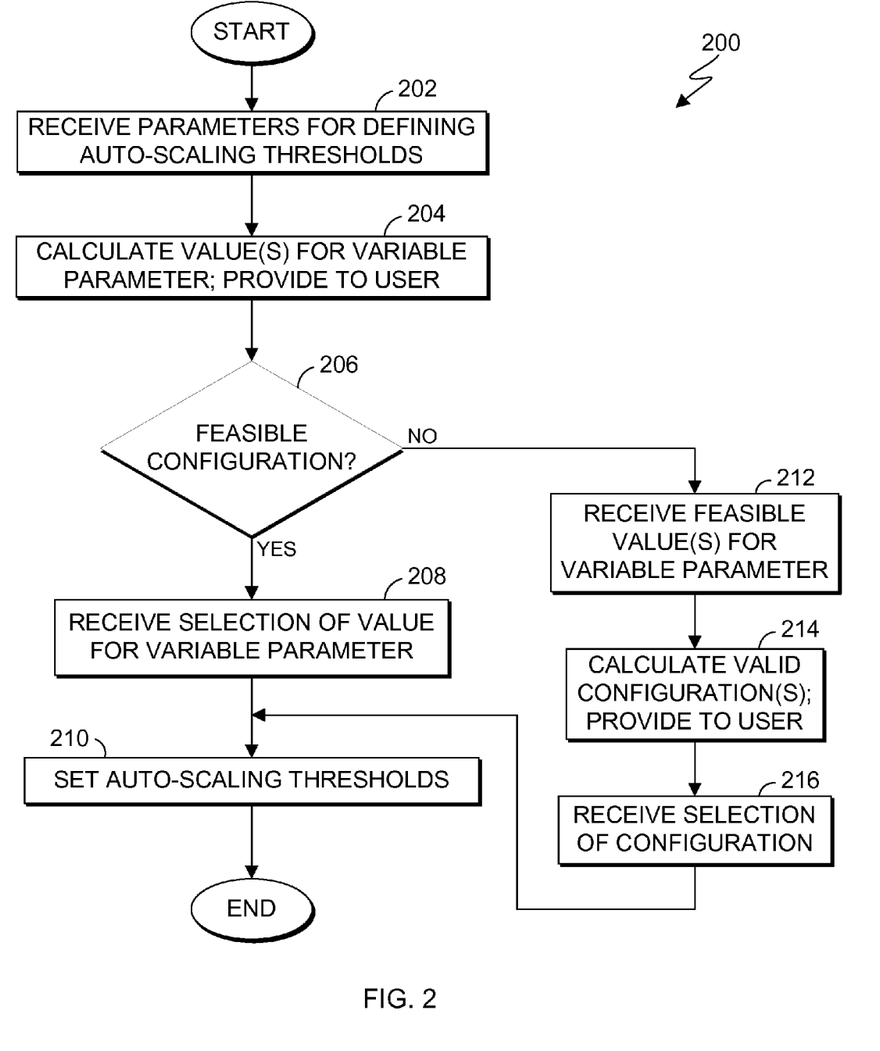
FIG. 2 is a flowchart illustrating operational steps for configuring auto-scaling parameters, in accordance with an embodiment of the present invention.

FIG. 2 is a flowchart 200 illustrating operational steps for configuring auto-scaling parameters, in accordance with an embodiment of the present invention.

In step 202, threshold configuration program 110 receives auto-scaling parameters. In this embodiment, a user of client program 104 enters initial values for a plurality of auto-scaling parameters to be used during performance of the requested computing task, which are then transmitted to threshold configuration program 110 via network 106. One auto-scaling parameter is not initially defined by the user and remains as a variable auto-scaling parameter. In this embodiment, the auto-scaling parameters are related to each other pursuant to the following inequality:

$$k < \frac{b(H-L)}{mL} \quad \text{Formula 1A}$$

$$s = km \quad \text{Formula 1B}$$

In Formulas 1A and 1B, "H" is an upper threshold for a performance metric, expressed as a percentage, that, if exceeded during performance of a requested computing task, can trigger an auto-scaling operation; "L" is a lower threshold for the performance metric, expressed as a percentage, below which an auto-scaling operation can be triggered; "k" is an increment by which allocated resources should be increased or decreased in an auto-scaling operation, expressed as a percentage of a maximum number of resources "m" that can be allocated for the requested computing task; "s" is the increment expressed as the number of resources to allocate or release in an auto-scaling operation; and "b" is a minimum number of resources that must be allocated for the requested computing task (i.e., an active resource capacity).

In step 204, threshold configuration program 110 calculates a range of values for a variable auto-scaling parameter not initially defined by the user. In this embodiment, threshold configuration program 110 calculates a range of values for the variable auto-scaling parameter according to the inequality of Formula 1, and provides the range of calculated values to the user by transmitting the range of values to client program 104 via network 106. For example, if threshold configuration program 110 received initially-defined values for "b", "k", "L", and "m", threshold configuration program 110 would solve the inequality of Formula 1 for the variable auto-scaling parameter "H" (e.g., H>75%); if threshold configuration program 110 received initially-defined values for "k", "H", "L", and "m", threshold configuration program 110 would solve the inequality of Formula 1 for the variable auto-scaling parameter "b" (e.g., b<50), and so on. The range of values can be presented to the user as a list or in any desired form.

In step 206, threshold configuration program 110 receives an indication of whether the range of values for the variable auto-scaling parameter (calculated in step 204), in conjunction with the initially-defined auto-scaling parameters, represent a feasible configuration for the computing environment in which the requested computing task will be performed. In this embodiment, the user, upon reviewing the initially-defined auto-scaling parameters and the calculated range of values for the variable auto-scaling parameters, can decide whether such a configuration is feasible given his or her knowledge of the needs and limitations of the computing task, resource pool 114, and/or other aspects of the computing environment in which the requested computing task will be performed. The user can then transmit an indication to threshold configuration program 110, via client program 104 and network 106, of whether the configuration is feasible.

If, in step 206, threshold configuration program 110 receives an indication that the range of values for the variable auto-scaling parameter, in conjunction with the initially-defined auto-scaling parameters, represents a feasible configuration, then, in step 208, threshold configuration program 110 receives a selection of a value for the variable parameter. In this embodiment, the user selects a value for the variable parameter from the range of calculated values and transmits the selected value to threshold configuration program 110 via client program 104 and network 106.

Figure 3:
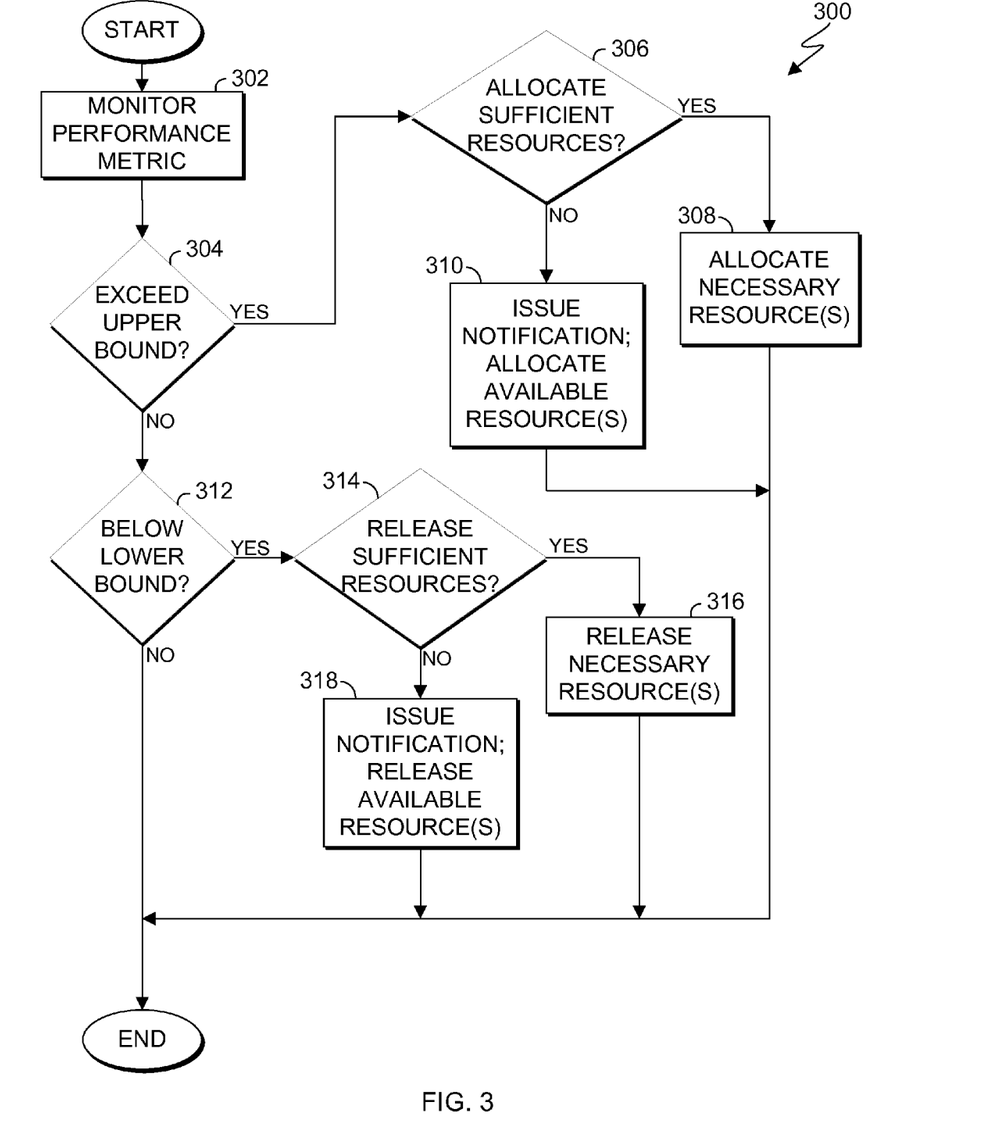
FIG. 3 is a flowchart illustrating operational steps for performing an auto-scaling operation, in accordance with an embodiment of the present invention.

After receiving a selected value for the variable auto-scaling parameter, in step 210, threshold configuration program 110 sets initially-defined auto-scaling parameters and the selected value for the variable auto-scaling parameter as the auto-scaling parameters to be used by resource management program 112 when monitoring performance of the requested computing task, as discussed in greater detail with regard to FIG. 3.

If, in step 206, threshold configuration program 110 receives an indication that the range of values for the variable auto-scaling parameter, in conjunction with the initially-defined auto-scaling parameters, does not represent a feasible configuration, then, in step 212, threshold configuration program 110 receives a feasible value for the variable parameter. In this embodiment, the user inputs and transmits the feasible value to threshold configuration program 110 via client program 104 and network 106.

In step 214, threshold configuration program 110 calculates one or more configurations based on the received feasible value for the variable parameter and the values of the other auto-scaling parameters, and provides the configurations to the user. In this embodiment, threshold configuration program 110 calculates one or more configurations according to the inequality of Formula 1, and provides the configurations to the user by transmitting the configurations to client program 104 via network 106. For example, if the variable parameter for which a feasible value was received in step 212 is "H", in step 214, threshold configuration program 110 calculates one or more configurations (i.e., combinations) of values for "b", "k", "L", and "m" that satisfy the inequality of Formula 1. Threshold configuration program 110 can do so by solving the inequality of Formula 1 for each of these values while using the received feasible value for the variable parameter. Configurations can be presented to the user as a list or in any desired form.

In step 216, threshold configuration program 110 receives a selection of a configuration of values for the auto-scaling parameters. In this embodiment, the user selects a configuration from the one or more configurations calculated by threshold configuration program 110 in step 214, and the selected configuration is transmitted to threshold configuration program 110 via client program 104 and network 106. After receiving a selected configuration, in step 210, threshold configuration program 110 sets the selected configuration as the auto-scaling parameters to be used by resource management program 112 when monitoring performance of the requested computing task, as discussed in greater detail with regard to FIG. 3.

Accordingly, by performing the operational steps of FIG. 2, threshold configuration program 110 can assist a user in defining optimal auto-scaling parameters. In this embodiment, threshold configuration program 110 uses the inequality of Formula 1 to calculate auto-scaling parameters that help reduce unnecessary sequences of auto-scaling operations and negative performance effects resulting therefrom. For example, calculating auto-scaling parameters according to the inequality of Formula 1 can help reduce incidences of oscillations of auto-scaling operations (e.g., where too many resources are added, triggering release of resources, which in turn triggers adding more resources, or where too many resources are released, triggering allocation of resources, which in turn triggers release of more resources). Calculating auto-scaling parameters according to the inequality of Formula 1 can also help optimize the size of increments (e.g., "k" or "s") by which resources are allocated and released, which can minimize the number of iterative auto-scaling operations that are needed to raise or lower the number of allocated resources to a desired level. In other embodiments, other formulas may be used to calculate auto-scaling parameters in a desired fashion.

FIG. 3 is a flowchart illustrating operational steps for performing an auto-scaling operation, in accordance with an embodiment of the present invention. In this embodiment, the operational steps of FIG. 3 are repeated at a specified interval when performing a requested computing task.

In step 302, resource management program 112 monitors a performance metric of allocated resources and/or the computing task being performed. In this embodiment, resource management program 112 monitors the utilization level "u" of resources that can be allocated for the computing task being performed. Utilization level "u" represents the extent to which resources have been allocated for the computing task, expressed as a percentage of the number of resources currently allocated for the computing task "$m_{active}$" compared to the maximum number of resources "m" that can be allocated for the computing task, according to the following formula:

$$u = 100 * \frac{m_{active}}{m} \qquad \text{Formula 2}$$

In other embodiments, throughput and/or average response time can be used as the monitored performance metric. In general, any suitable performance metric may be used, as will be appreciated by those of ordinary skill in the art.

In step 304, resource management program 112 accesses the upper threshold "H" set by threshold configuration program 110 (i.e., step 210 of FIG. 2), along with the other stored auto-scaling parameters "b", "k", "L", and "m", and determines whether the utilization level "u" exceeds the upper threshold "H".

If, in step 304, resource management program 112 determines that the utilization level "u" exceeds the upper threshold "H", then, in step 306, resource management program 112 determines whether a sufficient number of resources can be allocated for the computing task such that the utilization level "u" would be less than or equal to the upper threshold "H" and greater than or equal to the lower threshold "L".

Allocating more resources for the computing task typically decreases the utilization level for the computing task. In this embodiment, resource management program 112 calculates how many resources would have to be allocated for the computing task "$s_{allocate}$" according to the following formula:

$$m_{active} * \frac{u-H}{H} \leq s_{allocate} \leq m_{active} * \frac{u-L}{L} \qquad \text{Formula 3}$$

Resource management program 112 then determines whether $s_{allocate}$ resources can be allocated for the computing task without exceeding the maximum number of resources "m" that can be allocated for the computing task. That is, resource management program 112 determines whether $m_{active}+s_{allocate}>m$ is true. If $s_{allocate}$ resources can be allocated for the computing task without exceeding "m" (i.e., $m_{active}+s_{allocate} \leq m$), then resource management program 112 determines that a sufficient number of resources can be allocated for the computing task such that the utilization level "u" would be less than or equal to the upper threshold "H" and greater than or equal to the lower threshold "L". In step 308, resource management program 112 allocates the necessary resources equal to $s_{allocate}$.

If $s_{allocate}$ resources cannot be allocated for the computing task without exceeding m (i.e., $m_{active}+s_{allocate}>m$), then resource management program 112 determines that a sufficient number of resources cannot be allocated for the computing task such that the utilization level "u" would be less than or equal to the upper threshold "H" and greater than or equal to the lower threshold "L", and processing proceeds to step 310.

In step 310, resource management program 112 issues a notification and allocates as many resources as possible to the computing task without exceeding m. Stated differently, resource management program 112 allocates a number of resources equal to $m-m_{active}$. In this embodiment, resource management program 112 transmits the notification to client program 104 via network 106, for display to the user, and the notification can also be logged. In this embodiment, the notification includes a variety of information, including: an indication that the upper threshold was exceeded; an indication that, in the current configuration, a utilization level within the upper threshold and lower threshold can only be achieved if the number of resources that can be allocated for the computing task is increased beyond the current value for "m"; and a calculated value for ($m_{active}+s_{allocate}$), which represents a minimum value for "m" that would be needed to achieve a utilization level within the upper threshold and lower threshold in the current configuration.

If, in step 304, resource management program 112 determines that the utilization level "u" does not exceed the upper threshold "H", then, in step 312, resource management program 112 determines whether the utilization level "u" falls below the lower threshold "L".

If, in step 312, resource management program 112 determines that the utilization level "u" falls below the lower threshold "L", then, in step 314, resource management program 112 determines whether a sufficient number of allocated resources for the computing task can be released such that the utilization level "u" would be greater than or equal to the lower threshold "L" and less than or equal to the upper threshold "H". Releasing allocated resources for the computing task typically increases the utilization level for the computing task. In this embodiment, resource management program 112 calculates how many resources would have to be released for the computing task "$s_{release}$" according to the following formula:

$$m_{active} * \frac{L-u}{L} \leq s_{release} \leq m_{active} * \frac{H-u}{H} \qquad \text{Formula 4}$$

Resource management program 112 then determines whether $s_{release}$ resources can be released for the computing task without falling below the minimum number of resources "b" that must be allocated for the requested computing task. That is, resource management program 112 determines whether $m_{active} - s_{release} < b$ is true. If $s_{release}$ resources can be released without falling below "b" (i.e., $m_{active} - s_{release} \geq b$), then resource management program 112 determines that a sufficient number of allocated resources for the computing task can be released such that the utilization level "u" would be greater than or equal to the lower threshold "L" and less than or equal to the upper threshold "H". In step 316, resource management program 112 releases the necessary resources equal to $s_{release}$.

If $s_{release}$ resources cannot be released without falling below "b" (i.e., $m_{active} - s_{release} < b$), then resource management program 112 determines that a sufficient number of allocated resources for the computing task cannot be released such that the utilization level "u" would be greater than or equal to the lower threshold "L" and less than or equal to the upper threshold "H", and processing proceeds to step 318.

In step 318, resource management program 112 issues a notification and releases as many allocated resources for the computing task as possible without falling below b. Stated differently, resource management program 112 releases a number of allocated resources equal to $m_{active} - b$. In this embodiment, resource management program 112 transmits the notification to client program 104 via network 106, for display to the user, and the notification can also be logged. In this embodiment, the notification includes a variety of information, including: an indication performance fell below the lower threshold; an indication that, in the current configuration, a utilization level within the upper threshold and lower threshold can only be achieved if the number of resources that must allocated for the computing task is decreased beyond the current value for "b"; and a calculated value for ($m_{active} - s_{release}$), which represents a maximum value for "b" that would be needed to achieve a utilization level within the upper threshold and lower threshold in the current configuration.

Accordingly, by performing the operational steps of FIG. 3, resource management program 112 can perform auto-scale operations to allocate or release resources for the requested computing task, while also verifying whether such auto-scale operations can be achieved without violating auto-scale parameters set according to the inequality of Formula 1. Furthermore, where an auto-scale operation cannot be achieved without violating the auto-scaling parameters, resource management program 112 can also inform the user and assist the user in defining auto-scaling parameter values for a feasible configuration.

Figure 4A:
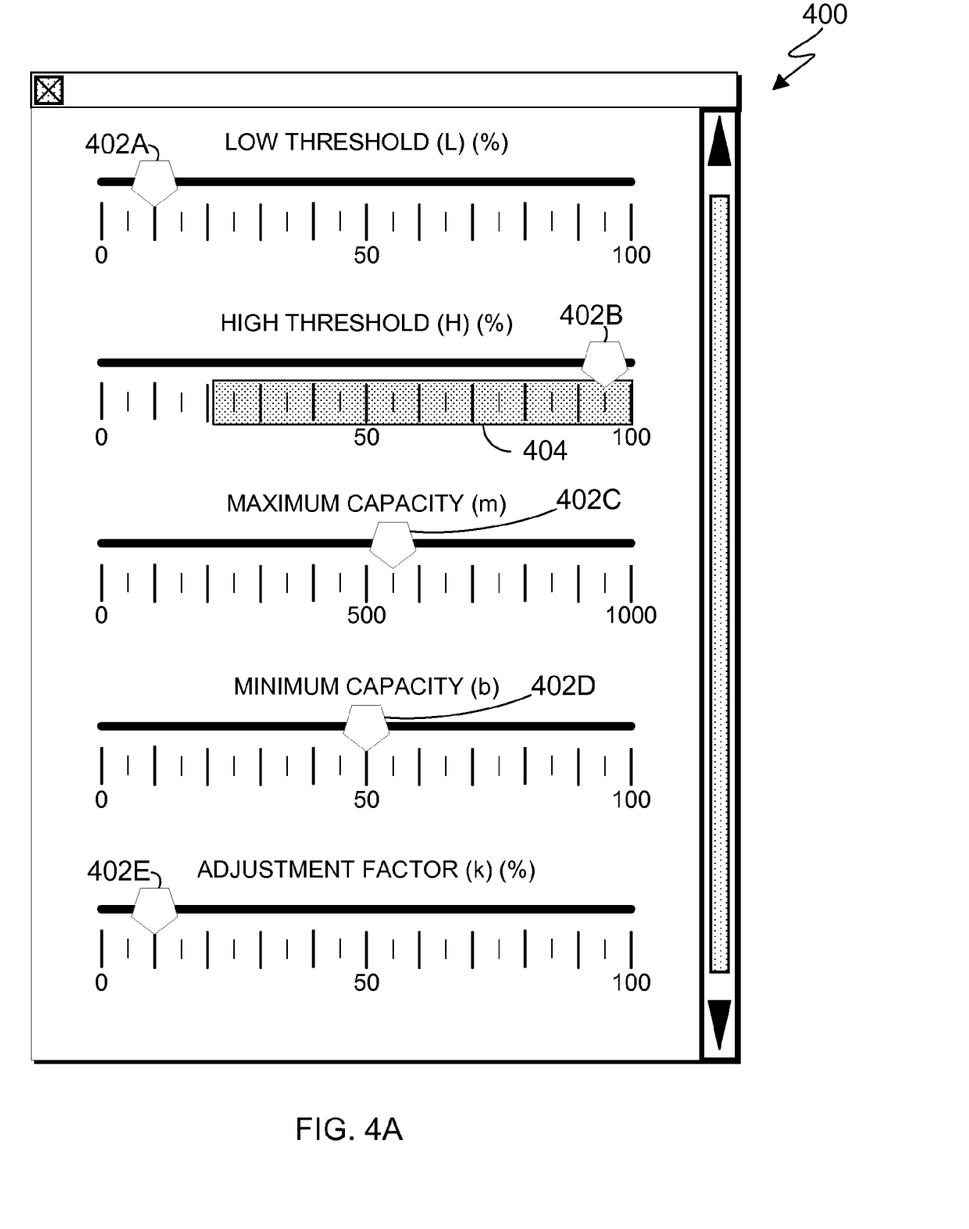
FIGS. 4A-4C illustrate an example user interface with which a user can configure auto-scaling parameters, in accordance with an embodiment of the present invention.
Figure 4B:
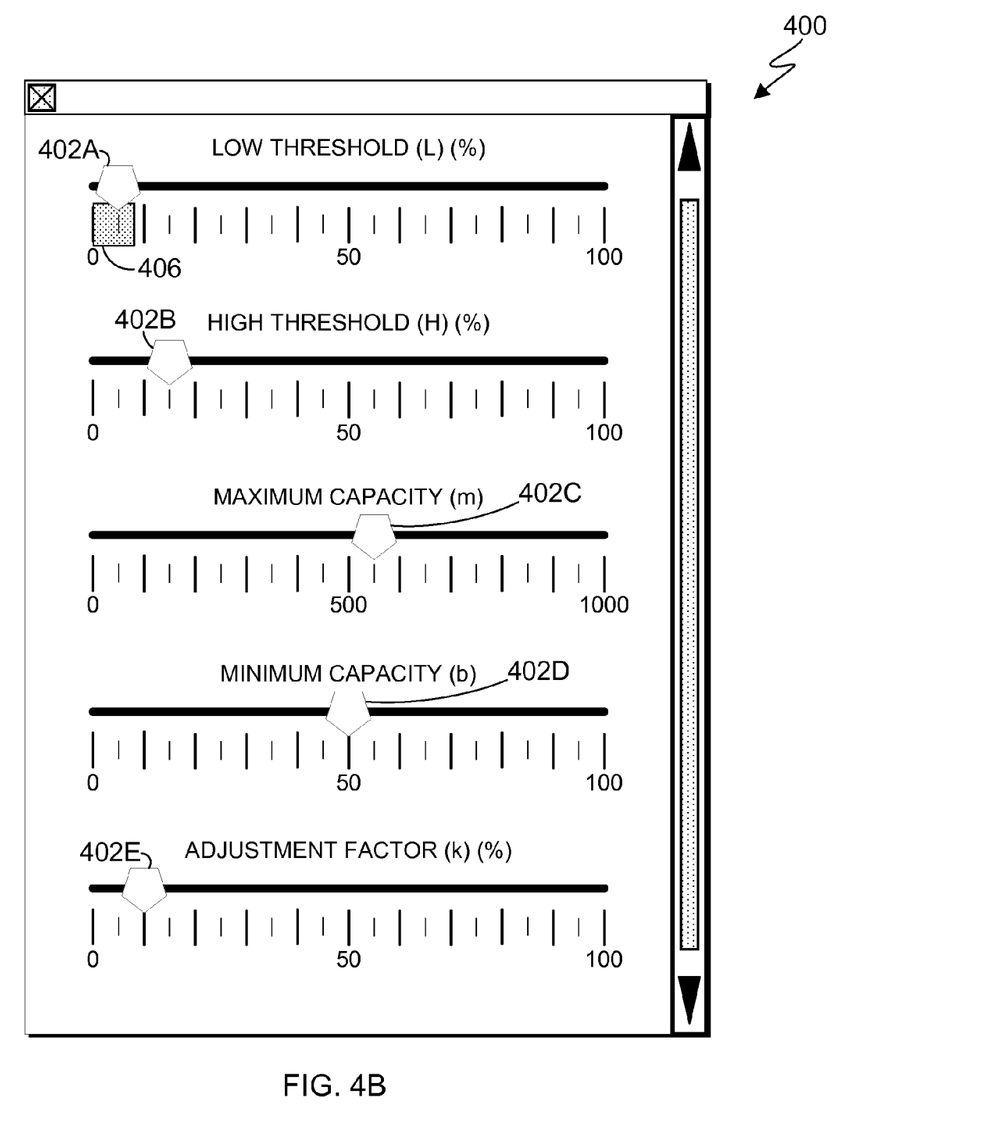
Figure 4C:
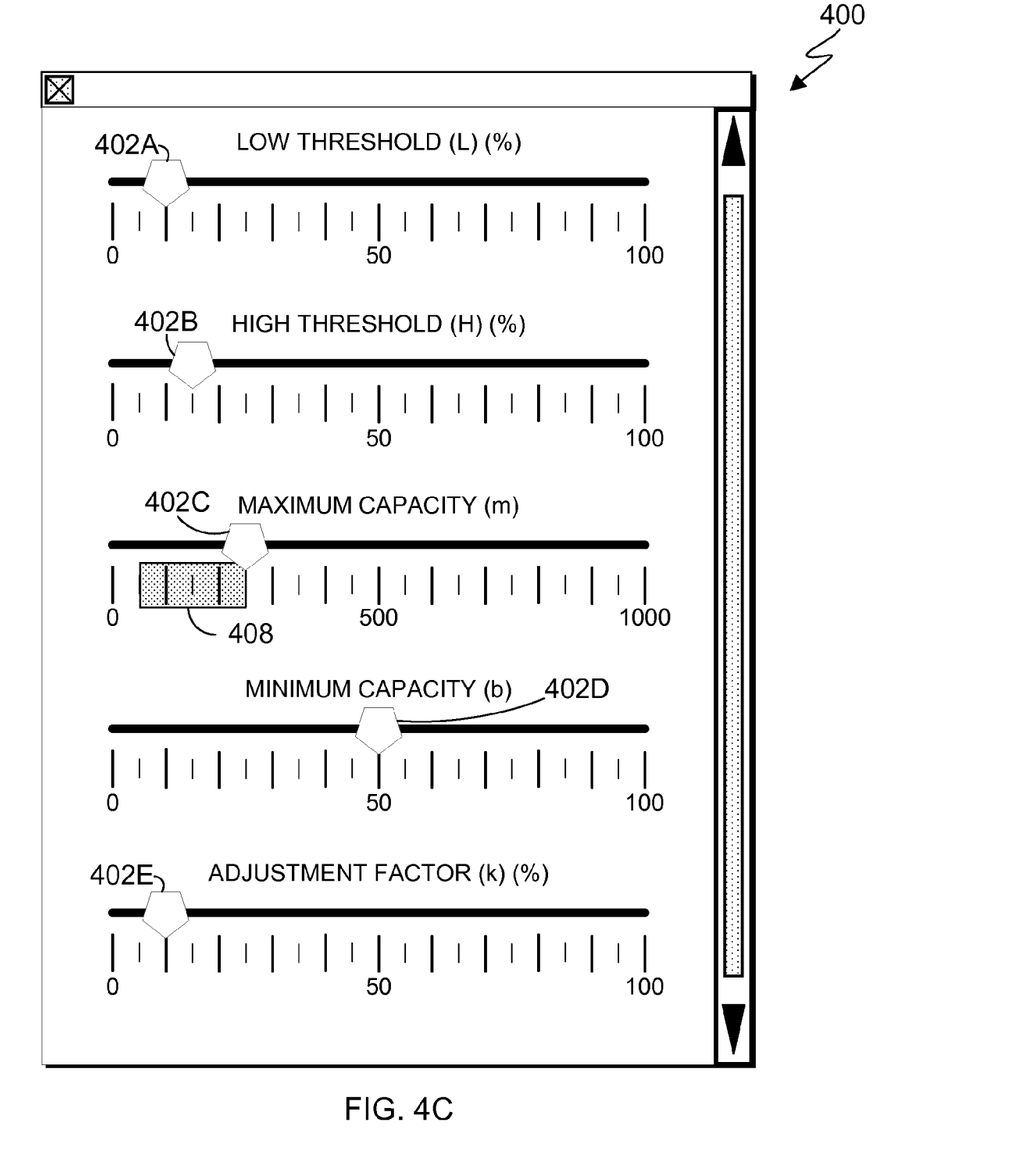

FIGS. 4A-4C illustrate an example user interface 400 with which a user can configure auto-scaling parameters, in accordance with an embodiment of the present invention. In this embodiment, the user interface is displayed to a user by client program 104, and uses data transmitted to and received from threshold configuration program 110 via network 106. In this manner, user interface 400 can be used to interactively assist a user in choosing an optimal configuration of auto-scaling parameters, as discussed below.

As shown, the example user interface includes sliders 402A-E for each of the five auto-scaling parameters discussed with regard to FIGS. 2 and 3. A user can move a slider (e.g., by clicking and dragging) to the left or right to decrease or increase the value of the corresponding auto-scaling parameter. In this example, slider 402A sets a value for low threshold (L) and has a range of 0% to 100% (i.e., 0 to 0.1); slider 402B sets a value for high threshold (H) and has a range of 0% to 100% (i.e., 0 to 0.1); slider 402C sets a value for maximum capacity (m) (i.e., maximum number of resources that can be allocated for the computing task) and has a range of 0 to 1,000 resources; slider 402D sets a value for minimum capacity (b) (i.e., minimum number of resources that must be allocated for the computing task) and has a range of 0 to 100 resources; and slider 402E sets a value for adjustment factor (k) (i.e., the increment by which allocated resources should be increased or decreased in an auto-scaling operation) and has a range of 0% to 100% (i.e., 0 to 0.1).

In FIG. 4A, the user has moved sliders to initially define values for four auto-scaling parameters: slider 402A has set a value of 10% (i.e., 0.10) for "L"; slider 402C has set a value of 550 resources for "m"; slider 402D has set a value of 50 resources for "b"; and slider 402E has set a value of 10% for "k" (i.e., 0.10). In response, these values were transmitted to threshold configuration program 110 via network 106, and threshold configuration program 110 calculated a range of values for the variable auto-scaling parameter "H" (not initially defined by the user) according to the inequality of Formula 1, and returned the calculated range of values to client program 104. In this example, client program 104 provides the calculated range of values for the auto-scaling parameter "H" to the user by showing a highlighted interval 404 of the calculated range of values for "H". Interval 404 contains values for "H" from approximately 21% to 100% (i.e., H>0.210), any of which, given the current values for the four other auto-scaling parameters, would result in a configuration that satisfies the inequality of Formula 1 (i.e., a feasible configuration). Accordingly, if slider 402B is moved within interval 404, the positions of sliders 402A, 402C, 402D, and 402E, and the values to which they correspond, do not change. However, as shown in FIGS. 4B and 4C, if slider 402B is moved outside of interval 404, such as to 15%, threshold configuration program 110 and client program 104 adjust sliders and values for one or more other auto-scaling parameters and to assist the user in finding a configuration that satisfies the inequality of Formula 1.

In FIG. 4B, as compared to FIG. 4A, slider 402B has been moved to 15% (i.e., 0.015), which is outside of interval 404 of FIG. 4A. In response, threshold configuration program 110 calculated a range of values for the auto-scaling parameter "L" according to the inequality of Formula 1, and returned the calculated range of values to client program 104. Client program 104 provided the calculated range of values for the auto-scaling parameter "L" to the user by showing a highlighted interval 406 of the calculated range of values for "L". Interval 406 contains values for "L" from 0 to approximately 7% (i.e., L<0.0714) which, given the current values for the four other auto-scaling parameters, would again result in a configuration that satisfies the inequality of Formula 1. Client program 104 also repositioned slider 402A to a value within interval 406 (i.e., 5%).

In FIG. 4C, as compared to FIG. 4A, slider 402B has been moved to 15% (i.e., 0.015), which is outside of interval 404 of FIG. 4A. In response, threshold configuration program 110 calculated a range of values for the auto-scaling parameter "m" according to the inequality of Formula 1, and returned the calculated range of values to client program 104. Client program 104 provided the calculated range of values for the auto-scaling parameter "m" to the user by showing a highlighted interval 408 of the calculated range of values for "m". Interval 408 contains values for "m". In this example, the range of values in interval 408 spans from 250 resources to 50 resources, because the value for "m" cannot be less than the value for "b". Again, given the current values for the four other auto-scaling parameters, selecting a value for "m" within interval 408 would result in a configuration that satisfies the inequality of Formula 1. Client program 104 also repositioned slider 402C to a value within interval 408 (i.e., 250).

Figure 5:
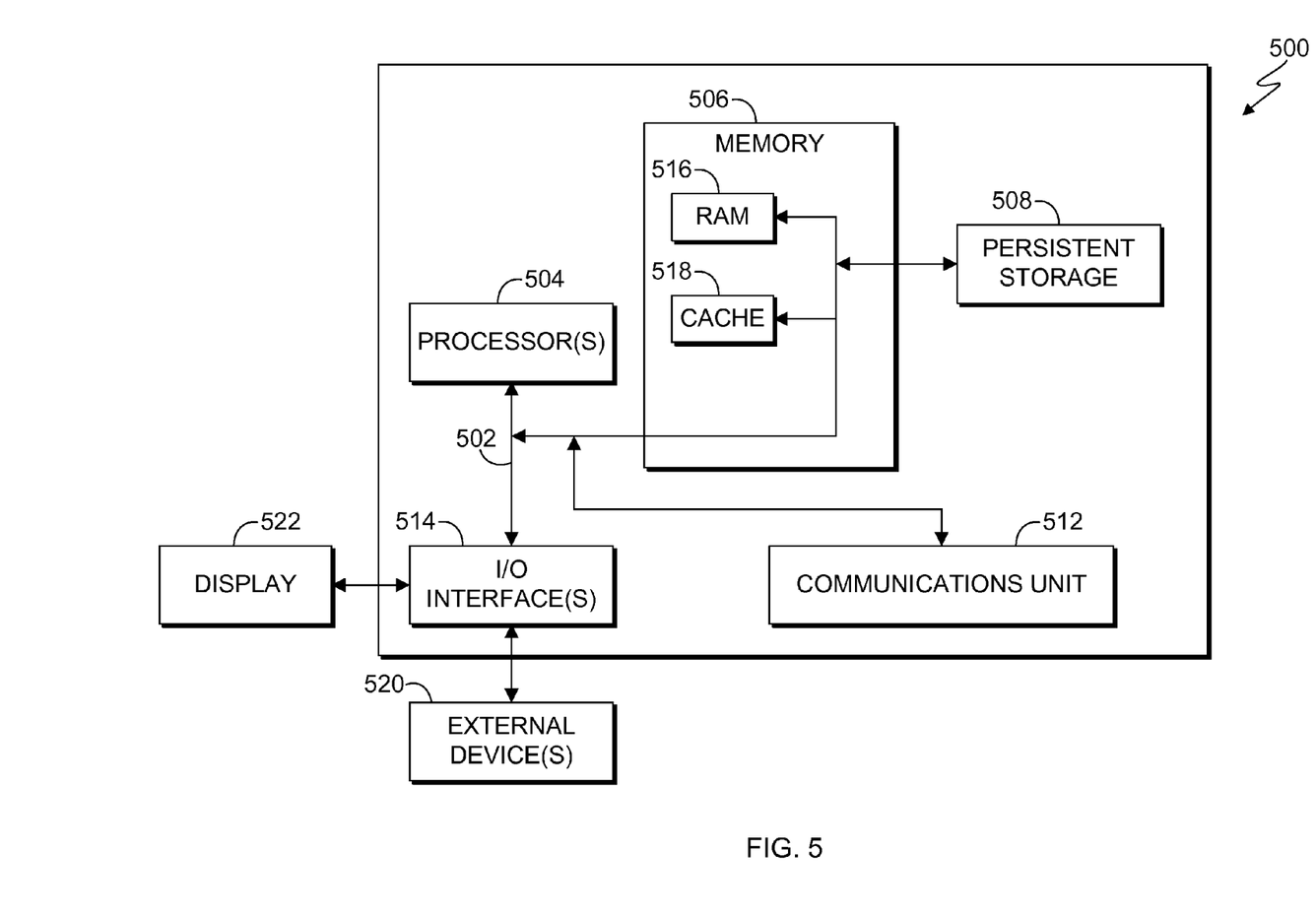
FIG. 5 is a block diagram of internal and external components of the computer systems of FIG. 1, in accordance with an embodiment of the present invention.

FIG. 5 is a block diagram of internal and external components of a computer system 500, which is representative the computer systems of FIG. 1, in accordance with an embodiment of the present invention. It should be appreciated that FIG. 5 provides only an illustration of one implementation and does not imply any limitations with regard to the environments in which different embodiments may be implemented. In general, the components illustrated in FIG. 5 are representative of any electronic device capable of executing machine-readable program instructions. Examples of computer systems, environments, and/or configurations that may be represented by the components illustrated in FIG. 5 include, but are not limited to, personal computer systems, server computer systems, thin clients, thick clients, laptop computer systems, tablet computer systems, cellular telephones (e.g., smart phones), multiprocessor systems, microprocessor-based systems, network PCs, minicomputer systems, mainframe computer systems, and distributed cloud computing environments that include any of the above systems or devices.

Computer system 500 includes communications fabric 502, which provides for communications between one or more processors 504, memory 506, persistent storage 508, communications unit 512, and one or more input/output (I/O) interfaces 514. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses.

Memory 506 and persistent storage 508 are computer-readable storage media. In this embodiment, memory 506 includes random access memory (RAM) 516 and cache memory 518. In general, memory 506 can include any suitable volatile or non-volatile computer-readable storage media. Software and data is stored in persistent storage 508 for execution and/or access by one or more of the respective processors 504 via one or more memories of memory 506.

Persistent storage 508 may include, for example, a plurality of magnetic hard disk drives. Alternatively, or in addition to magnetic hard disk drives, persistent storage 508 can include one or more solid state hard drives, semiconductor storage devices, read-only memories (ROM), erasable programmable read-only memories (EPROM), flash memories, or any other computer-readable storage media that is capable of storing program instructions or digital information.

The media used by persistent storage 508 can also be removable. For example, a removable hard drive can be used for persistent storage 508. Other examples include optical and magnetic disks, thumb drives, and smart cards that are inserted into a drive for transfer onto another computer-readable storage medium that is also part of persistent storage 508.

Communications unit 512 provides for communications with other computer systems or devices via a network (e.g., network 106). In this exemplary embodiment, communications unit 512 includes network adapters or interfaces such as a TCP/IP adapter cards, wireless Wi-Fi interface cards, or 3G or 4G wireless interface cards or other wired or wireless communication links. The network can comprise, for example, copper wires, optical fibers, wireless transmission, routers, firewalls, switches, gateway computers and/or edge servers. Software and data used to practice embodiments of the present invention can be downloaded to 500 through communications unit 512 (e.g., via the Internet, a local area network or other wide area network). From communications unit 512, the software and data can be loaded onto persistent storage 508.

One or more I/O interfaces 514 allow for input and output of data with other devices that may be connected to computer system 500. For example, I/O interface 514 can provide a connection to one or more external devices 520 such as a keyboard, computer mouse, touch screen, virtual keyboard, touch pad, pointing device, or other human interface devices. External devices 520 can also include portable computer-readable storage media such as, for example, thumb drives, portable optical or magnetic disks, and memory cards. I/O interface 514 also connects to display 522.

Display 522 provides a mechanism to display data to a user and can be, for example, a computer monitor. Display 522 can also be an incorporated display and may function as a touch screen, such as a built-in display of a tablet computer.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for configuring auto-scaling parameters of a computing environment, comprising:

receiving, by one or more computer processors, specified values for one or more auto-scaling parameters of a plurality of auto-scaling parameters to be used in a computing environment; and calculating, by one or more computer processors, a configuration for the plurality of auto-scaling parameters as a function of the specified values, wherein the configuration reduces an amount of auto-scaling operations needed to raise or lower an amount of resources allocated for the computing environment to a desired level, wherein calculating, by one or more computer processors, a configuration for the plurality of auto-scaling parameters as a function of the specified values comprises:

calculating, by one or more computer processors, a value for an auto-scaling parameter according to a formula:

$$k < \frac{b(H-L)}{mL},$$

where (L) is a lower threshold for a performance metric, (H) is an upper threshold for the performance metric, (k) is an increment by which allocated resources should be increased or decreased in an auto-scaling operation, (m) is a maximum number of resources that can be allocated for a computing task, and (b) is a minimum number of resources that must be allocated for the computing task.

2. The method of claim 1, wherein the plurality of auto-scaling parameters comprise a lower threshold, an upper threshold, an increment by which allocated resources should be increased or decreased in an auto-scaling operation, a maximum number of resources that can be allocated for a computing task, and a minimum number of resources that must be allocated for a computing task.

3. The method of claim 1, further comprising:
monitoring, by one or more computer processors, a performance metric of the computing environment;
determining, by one or more computer processors, whether the performance metric has exceeded the upper threshold or has fallen below the lower threshold; and
responsive to determining that the performance metric has exceeded the upper threshold or has fallen below the lower threshold, performing, by one or more computer processors, an auto-scaling operation for the computing environment.

4. The method of claim 1, further comprising:
monitoring, by one or more computer processors, a performance metric of the computing environment;
determining, by one or more computer processors, whether the performance metric has exceeded the upper threshold or has fallen below the lower threshold;
responsive to determining that the performance metric has exceeded the upper threshold, determining, by one or more computer processors, whether a sufficient number of resources can be allocated for the computing environment such that the performance metric is below the upper threshold;
responsive to determining that a sufficient number of resources can be allocated for the computing environment such that the performance metric is below the upper threshold, allocating, by one or more computer processors, a sufficient number of resources for the computing environment such that the performance metric is below the upper threshold and above the lower threshold;
responsive to determining that the performance metric has fallen below the lower threshold, determining, by one or more computer processors, whether a sufficient number of resources of the computing environment can be released such that the performance metric is above the lower threshold; and
responsive to determining that a sufficient number of resources of the computing environment can be released such that the performance metric is above the lower threshold, releasing, by one or more computer processors, a sufficient number of resources of the computing environment such that the performance metric is above the lower threshold and below the lower threshold.

5. The method of claim 4, further comprising:
responsive to determining that a sufficient number of resources cannot be allocated for the computing environment or that a sufficient number of resources of the computing environment cannot be released, such that the performance metric is below the upper threshold and above the lower threshold, issuing, by one or more computer processors, a notification.

6. The method of claim 1, further comprising:
providing, by one or more computer processors, a user interface with which a user can specify values for one or more auto-scaling parameters of the plurality of auto-scaling parameters to be used in the computing environment;
responsive to a user specifying values for one or more auto-scaling parameters with the user interface, calculating, by one or more computer processors, values for one or more other auto-scaling parameters of the plurality of auto-scaling parameters as a function of the specified values; and
displaying at the user interface, by one or more computer processors, the calculated values.

7. A computer program product for configuring auto-scaling parameters of a computing environment, comprising:
one or more computer readable storage media and program instructions stored on the one or more computer readable storage media for execution by at least one computer processor, wherein the one or more computer readable storage media is not a transitory signal per se, the program instructions comprising:
program instructions to receive specified values for one or more auto-scaling parameters of a plurality of auto-scaling parameters to be used in a computing environment; and
program instructions to calculate a configuration for the plurality of auto-scaling parameters as a function of the specified values, wherein the configuration reduces an amount of auto-scaling operations needed to raise or lower an amount of resources allocated for the computing environment to a desired level, wherein the program instructions to calculate a configuration for the plurality of auto-scaling parameters as a function of the specified values comprise:
program instructions to calculate a value for an auto-scaling parameter according to a formula:

$$k < \frac{b(H-L)}{mL},$$

where (L) is a lower threshold for a performance metric, (H) is an upper threshold for the performance metric, (k) is an increment by which allocated resources should be increased or decreased in an auto-scaling operation, (m) is a maximum number of resources that can be allocated for a computing task, and (b) is a minimum number of resources that must be allocated for the computing task.

8. The computer program product of claim 7, wherein the plurality of auto-scaling parameters comprise a lower threshold, an upper threshold, an increment by which allocated resources should be increased or decreased in an auto-scaling operation, a maximum number of resources that can be allocated for a computing task, and a minimum number of resources that must be allocated for a computing task.

9. The computer program product of claim 7, wherein the program instructions stored on the one or more computer readable storage media further comprise:

program instructions to monitor a performance metric of the computing environment;
program instructions to determine whether the performance metric has exceeded the upper threshold or has fallen below the lower threshold; and
program instructions to, responsive to determining that the performance metric has exceeded the upper threshold or has fallen below the lower threshold, perform an auto-scaling operation for the computing environment.

10. The computer program product of claim 7, wherein the program instructions stored on the one or more computer readable storage media further comprise:
program instructions to monitor a performance metric of the computing environment;
program instructions to determine whether the performance metric has exceeded the upper threshold or has fallen below the lower threshold;
program instructions to, responsive to determining that the performance metric has exceeded the upper threshold, determine whether a sufficient number of resources can be allocated for the computing environment such that the performance metric is below the upper threshold;
program instructions to, responsive to determining that a sufficient number of resources can be allocated for the computing environment such that the performance metric is below the upper threshold, allocate a sufficient number of resources for the computing environment such that the performance metric is below the upper threshold and above the lower threshold;
program instructions to, responsive to determining that the performance metric has fallen below the lower threshold, determine whether a sufficient number of resources of the computing environment can be released such that the performance metric is above the lower threshold; and
program instructions to, responsive to determining that a sufficient number of resources of the computing environment can be released such that the performance metric is above the lower threshold, release a sufficient number of resources of the computing environment such that the performance metric is above the lower threshold and below the lower threshold.

11. The computer program product of claim 10, wherein the program instructions stored on the one or more computer readable storage media further comprise:
program instructions to, responsive to determining that a sufficient number of resources cannot be allocated for the computing environment or that a sufficient number of resources of the computing environment cannot be released, such that the performance metric is below the upper threshold and above the lower threshold, issue a notification.

12. The computer program product of claim 7, wherein the program instructions stored on the one or more computer readable storage media further comprise:
program instructions to provide a user interface with which a user can specify values for one or more auto-scaling parameters of the plurality of auto-scaling parameters to be used in the computing environment;
program instructions to, responsive to a user specifying values for one or more auto-scaling parameters with the user interface, calculate values for one or more other auto-scaling parameters of the plurality of auto-scaling parameters as a function of the specified values; and
program instructions to display at the user interface the calculated values.

13. A computer system for configuring auto-scaling parameters of a computing environment, comprising:
one or more computer processors;
one or more computer readable storage media; program instructions stored on the one or more computer readable storage media for execution by at least one of the one or more processors, wherein the one or more computer readable storage media is not a transitory signal per se, the program instructions comprising:
program instructions to receive specified values for one or more auto-scaling parameters of a plurality of auto-scaling parameters to be used in a computing environment; and
program instructions to calculate a configuration for the plurality of auto-scaling parameters as a function of the specified values, wherein the configuration reduces an amount of auto-scaling operations needed to raise or lower an amount of resources allocated for the computing environment to a desired level, wherein the program instructions to calculate a configuration for the plurality of auto-scaling parameters as a function of the specified values comprise:
program instructions to calculate a value for an auto-scaling parameter according to a formula:

$$k < \frac{b(H-L)}{mL},$$

where (L) is a lower threshold for a performance metric, (H) is an upper threshold for the performance metric, (k) is an increment by which allocated resources should be increased or decreased in an auto-scaling operation, (m) is a maximum number of resources that can be allocated for a computing task, and (b) is a minimum number of resources that must be allocated for the computing task.

14. The computer system of claim 13, wherein the plurality of auto-scaling parameters comprise a lower threshold, an upper threshold, an increment by which allocated resources should be increased or decreased in an auto-scaling operation, a maximum number of resources that can be allocated for a computing task, and a minimum number of resources that must be allocated for a computing task.

15. The computer system of claim 13, wherein the program instructions stored on the one or more computer readable storage media further comprise:
program instructions to monitor a performance metric of the computing environment;
program instructions to determine whether the performance metric has exceeded the upper threshold or has fallen below the lower threshold;
program instructions to, responsive to determining that the performance metric has exceeded the upper threshold, determine whether a sufficient number of resources can be allocated for the computing environment such that the performance metric is below the upper threshold;
program instructions to, responsive to determining that a sufficient number of resources can be allocated for the computing environment such that the performance metric is below the upper threshold, allocate a sufficient number of resources for the computing environment such that the performance metric is below the upper threshold and above the lower threshold;
program instructions to, responsive to determining that the performance metric has fallen below the lower threshold, determine whether a sufficient number of resources of the computing environment can be released such that the performance metric is above the lower threshold; and program instructions to, responsive to determining that a sufficient number of resources of the computing environment can be released such that the performance metric is above the lower threshold, release a sufficient number of resources of the computing environment such that the performance metric is above the lower threshold and below the lower threshold.

16. The computer system of claim 15, wherein the program instructions stored on the one or more computer readable storage media further comprise:

program instructions to, responsive to determining that a sufficient number of resources cannot be allocated for the computing environment or that a sufficient number of resources of the computing environment cannot be released, such that the performance metric is below the upper threshold and above the lower threshold, issue a notification.

17. The computer system of claim 13, wherein the program instructions stored on the one or more computer readable storage media further comprise:

program instructions to provide a user interface with which a user can specify values for one or more auto-scaling parameters of the plurality of auto-scaling parameters to be used in the computing environment;

program instructions to, responsive to a user specifying values for one or more auto-scaling parameters with the user interface, calculate values for one or more other auto-scaling parameters of the plurality of auto-scaling parameters as a function of the specified values; and program instructions to display at the user interface the calculated values.

* * * * *